United States Patent
Higuchi et al.

(10) Patent No.: US 11,797,092 B2
(45) Date of Patent: Oct. 24, 2023

(54) ELECTRONIC APPARATUS THAT GENERATES ILLUSION OF DIAGONAL TRACTION

(71) Applicant: Nippon Telegraph and Telephone Corporation, Tokyo (JP)

(72) Inventors: Yuichi Higuchi, Tokyo (JP); Koichi Hadama, Tokyo (JP); Toshiki Wada, Tokyo (JP); Toshihiko Kondo, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 141 days.

(21) Appl. No.: 17/436,776

(22) PCT Filed: Mar. 11, 2020

(86) PCT No.: PCT/JP2020/010451
§ 371 (c)(1),
(2) Date: Sep. 7, 2021

(87) PCT Pub. No.: WO2020/195813
PCT Pub. Date: Oct. 1, 2020

(65) Prior Publication Data
US 2022/0179490 A1    Jun. 9, 2022

(30) Foreign Application Priority Data
Mar. 26, 2019    (JP) .................. 2019-057939

(51) Int. Cl.
*G06F 3/01*    (2006.01)

(52) U.S. Cl.
CPC .................... *G06F 3/016* (2013.01)

(58) Field of Classification Search
CPC ....... G06F 3/016; G06F 3/04883; B06B 1/12; A63F 13/285; A63F 13/92
See application file for complete search history.

(56) References Cited

U.S. PATENT DOCUMENTS

| | | | | |
|---|---|---|---|---|
| 2012/0232780 | A1* | 9/2012 | Delson | A63F 13/24 340/407.1 |
| 2013/0257601 | A1* | 10/2013 | Kono | G08B 6/00 340/407.1 |
| 2018/0369865 | A1 | 12/2018 | Shoji et al. | |
| 2020/0001326 | A1* | 1/2020 | Takahashi | G06F 3/01 |

FOREIGN PATENT DOCUMENTS

| | | | | |
|---|---|---|---|---|
| JP | 2008546534 A | | 12/2008 | |
| JP | 2011183374 A | | 9/2011 | |
| JP | 2018118233 A | * | 8/2018 | ............... B06B 1/04 |
| WO | 2007002775 A2 | | 1/2007 | |
| WO | 2017115729 A1 | | 7/2017 | |
| WO | 2018139542 A1 | | 8/2018 | |

* cited by examiner

*Primary Examiner* — Quan Zhen Wang
*Assistant Examiner* — Mancil Littlejohn, Jr.
(74) *Attorney, Agent, or Firm* — Slater Matsil, LLP

(57) ABSTRACT

Inside a housing of electronic equipment, a first actuator for generating vibration along a first axis is mounted. The first actuator is mounted in a direction in which the first axis is non-parallel and non-perpendicular to at least one of the six surfaces.

9 Claims, 10 Drawing Sheets

ELECTRONIC APPARATUS THAT GENERATES ILLUSION OF DIAGONAL TRACTION

CROSS-REFERENCE TO RELATED APPLICATIONS

This application is a national phase entry of PCT Application No. PCT/JP2020/010451, filed on Mar. 11, 2020, which claims priority to Japanese Application No. 2019-057939, filed on Mar. 26, 2019, which applications are hereby incorporated herein by reference.

TECHNICAL FIELD

The present invention relates to a traction illusion generating technique in electronic equipment, which generates a traction illusion by vibration of an actuator.

BACKGROUND

Conventionally, a so-called haptic device has been proposed as a pseudo-haptic touch generator that causes a person to sense a pseudo-haptic touch by asymmetric vibration of an actuator (oscillator) (e.g., see Patent Literature 1). This type of haptic device is a device using human illusions and can produce a traction illusion that a hand is being pulled in a particular direction even though the hand is not physically being pulled.

CITATION LIST

Patent Literature

Patent Literature 1: Japanese domestic re-publication of PCT international application No. 2017-115729.

SUMMARY

Technical Problem

Such a haptic device has been considered to be mounted on small portable electronic equipment having a flat rectangular parallelepiped shape with a space inside, such as a smartphone, a tablet, and a portable game machine. Normally, in this type of electronic equipment, a display screen is disposed in the center of a rectangular upper surface, and when a user operates an application such as a game, it is assumed that the user holds the two short sides on the right and left-sides with the right and left hands, respectively, so that the long side of the upper surface is in the right and left direction with both arms in front.

A general actuator used in a haptic device has a quadrangular prism shape as a whole, and it is desirable to dispose the actuator in a direction parallel or perpendicular to all six surfaces constituting a housing in consideration of the miniaturization of the housing and the placement space of the actuator. However, in many actuators, vibration is generated in the longitudinal direction, and such placement thus has a problem that only a traction illusion in a direction perpendicular to any of the six surfaces can be generated and that a traction illusion cannot be generated in an oblique direction having an inclination with these surfaces.

Embodiments of the present invention are intended to solve such a problem, and an object of embodiments of the present invention is to provide a traction illusion generating technique capable of generating a traction illusion in an arbitrary oblique direction.

Means for Solving the Problem

For achieving such an object, electronic equipment according to embodiments of the present invention is provided with: a portable housing that has a substantially rectangular parallelepiped shape with six surfaces of an upper surface, a lower surface, a front surface, a rear surface, a left-side surface, and a right-side surface; a first actuator that is mounted inside the housing and configured to generate vibration along a first axis; and a control circuit configured to drive the first actuator to generate a traction illusion. The first actuator is mounted in a direction in which the first axis is non-parallel and non-perpendicular to at least one of the six surfaces.

One configuration example of the electronic equipment according to embodiments of the present invention is further provided with a second actuator that is mounted inside the housing and configured to generate vibration along a second axis. The control circuit is configured to drive the first and second actuators to generate a traction illusion, and the second actuator is mounted in a direction in which the second axis is non-parallel and non-perpendicular to at least one of the six surfaces.

In one configuration example of the electronic equipment according to embodiments of the present invention, the first and second actuators are disposed near the left-side surface and the right-side surface of the six surfaces, respectively.

In one configuration example of the electronic equipment according to embodiments of the present invention, the first and second actuators are mounted in a direction in which the first and second axes are each non-parallel and non-perpendicular to a common one of the six surfaces.

In one configuration example of the electronic equipment according to embodiments of the present invention, the first and second actuators are mounted in a direction in which the first and second axes have opposite inclinations to each other by an equal angle across the common surface.

In one configuration example of the electronic equipment according to embodiments of the present invention, the first and second actuators are mounted in a direction in which the first and second axes are each non-parallel and non-perpendicular to at least the left-side surface or the right-side surface of the six surfaces.

In one configuration example of the electronic equipment according to embodiments of the present invention, the first and second actuators are mounted in a direction in which the first and second axes are each non-parallel and non-perpendicular to at least the upper surface or the lower surface of the six surfaces.

In one configuration example of the electronic equipment according to embodiments of the present invention, the first and second actuators are mounted in a direction in which the first and second axes are each non-parallel and non-perpendicular to both of at least the left-side surface or the right-side surface and at least the upper surface or the lower surface of the six surfaces.

In one configuration example of the electronic equipment according to embodiments of the present invention, the first and second actuators are mounted in a direction in which the first and second axes are non-parallel to each other, and the first and second actuators are driven by the control circuit with different vibration intensities from each other.

Another electronic equipment according to embodiments of the present invention is provided with: a portable housing having a space inside; a first actuator that is mounted inside the housing and configured to generate vibration along a first axis; and a control circuit configured to drive the first actuator to generate a traction illusion. The first actuator is mounted in a direction in which the first axis is non-perpendicular to a direction along at least one axis of a three-dimensional local coordinate system defined in advance for the housing.

Effects of Embodiments of the Invention

According to embodiments of the present invention, it is possible to generate a traction illusion in an arbitrary oblique direction in the housing of the electronic equipment. Hence it is possible to make the user feel a richer traction illusion and to enhance expressive power in an application, such as a game, performed by the electronic equipment.

DETAILED DESCRIPTION OF ILLUSTRATIVE EMBODIMENTS

Next, embodiments of the present invention will be described with reference to the drawings.

First Embodiment

Figure 1:
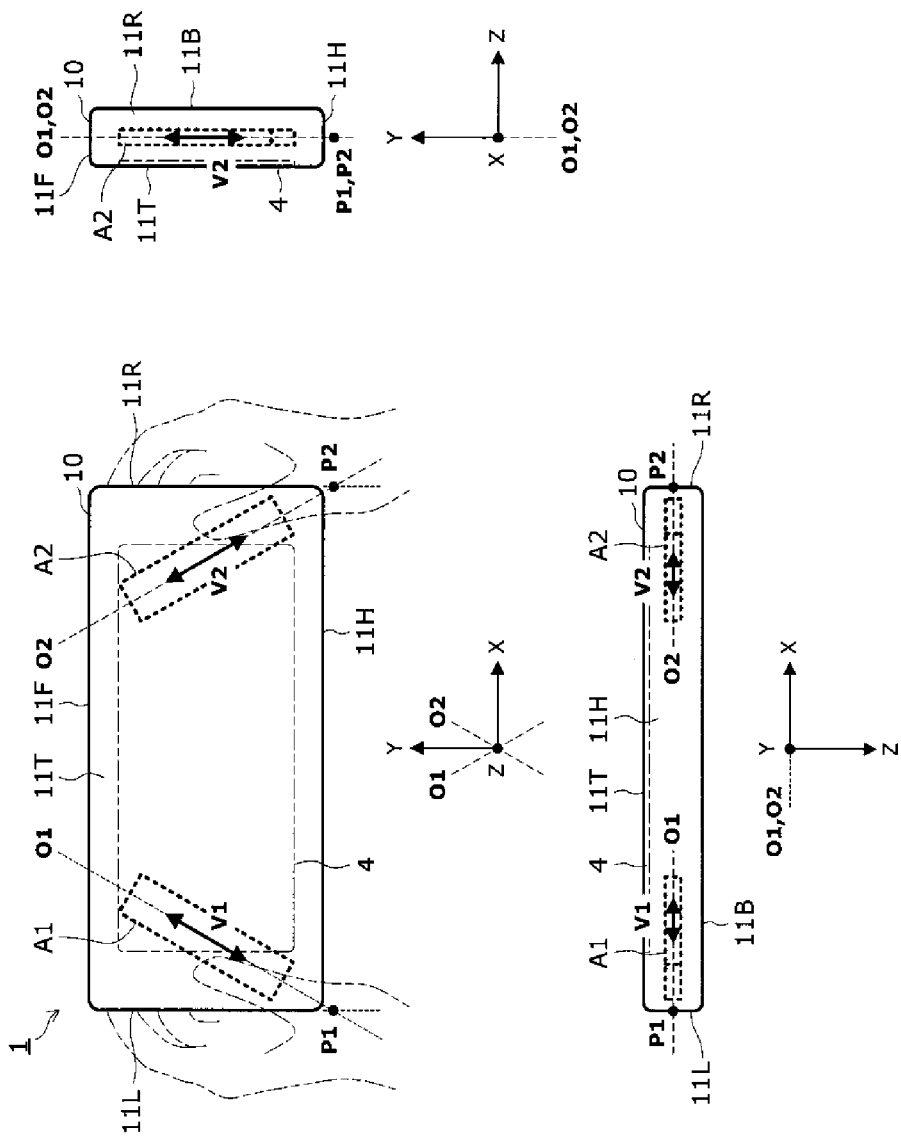
FIG. 1 is a three-side view showing a configuration of electronic equipment according to a first embodiment.
Figure 2:
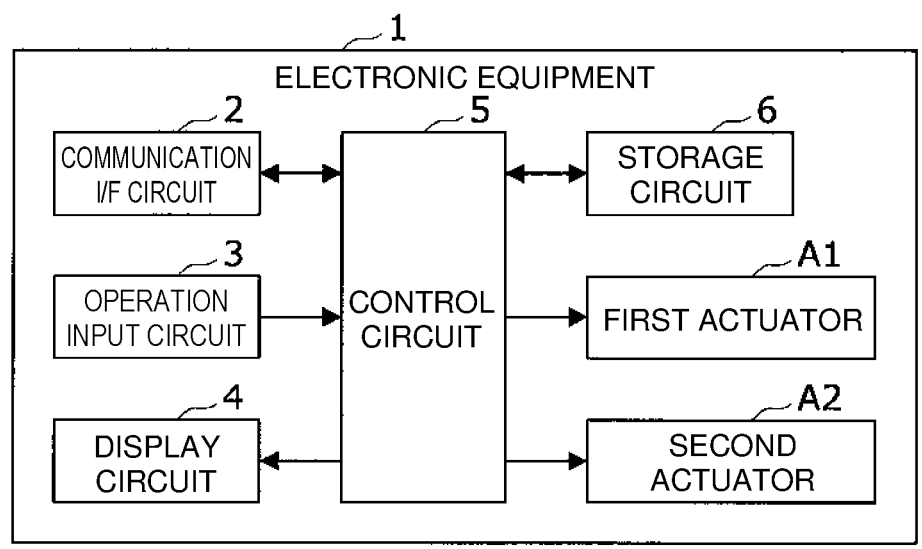
FIG. 2 is a block diagram showing a circuit configuration of the electronic equipment.
Figure 3:
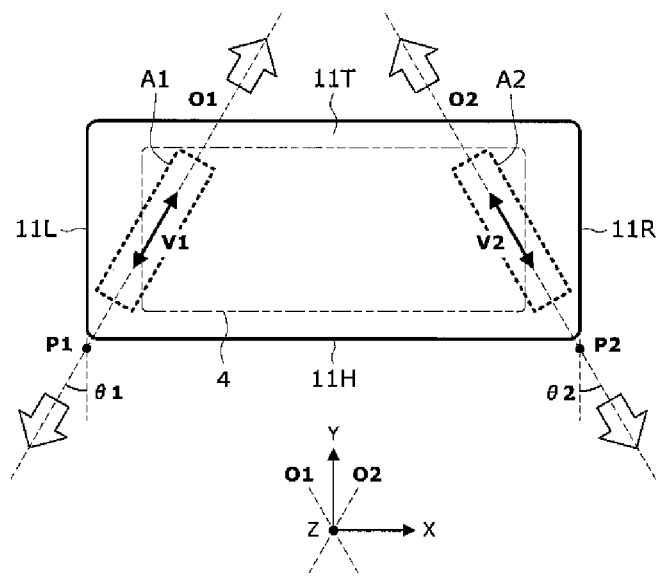
FIG. 3 is a top view showing a placement example of actuators according to the first embodiment.

First, electronic equipment 1 according to a first embodiment of the present invention will be described with reference to FIGS. 1, 2, and 3. FIG. 1 is a three-side view showing a configuration of the electronic equipment according to the first embodiment. FIG. 2 is a block diagram showing a circuit configuration of the electronic equipment. FIG. 3 is a top view showing a placement example of actuators according to the first embodiment.

Like a smartphone, a tablet, and a portable game machine, the electronic equipment 1 according to embodiments of the present invention has a small portable housing 10 having a substantially rectangular parallelepiped shape of a flat plate with six surfaces of an upper surface 11T, a lower surface 1B, a front surface 1F, a rear surface 11H, a left-side surface 11L, and a right-side surface 11R.

In the following description, directions along the X, Y, and Z axes orthogonal to each other will be referred to as the directions X Y, and Z, respectively. Further, of the six surfaces constituting the housing 10, the left-side surface 11L and the right-side surface 11R are assumed to face each other in parallel along the direction X, the front surface 1F and the rear surface 11H are assumed to face each other in parallel along the direction Y, and the upper surface 11T and the lower surface 11B are assumed to face each other in parallel along the direction Z. Virtual planes parallel to the upper surface 11T and lower surface 1B, the front surface 1F and rear surface 11H, and the left-side surface 11L and the right-side surface 11R are referred to as a virtual plane XY, a virtual plane XZ (ZX), and a virtual plane YZ.

As shown in FIG. 2, the electronic equipment 1 is mounted with, as main circuit components, a communication interface (I/F) circuit 2, an operation input circuit 3, a display circuit 4, a storage circuit 5, a control circuit 6, a first actuator A1, and a second actuator A2, and these circuit units are mounted in a space inside the housing 10.

The communication I/F circuit 2 is a circuit unit that performs data communication with an external apparatus (not shown) via a wireless line or a wired line.

The operation input circuit 3 includes an operation input apparatus, such as a touch key, an operation button, and an operation switch, and is a circuit unit for detecting a user's operation and outputting the operation to the control circuit 6.

The display circuit 4 includes a display apparatus, such as a liquid crystal display (LCD) or a light-emitting diode (LED), and is a circuit unit for visually displaying the display content output from the control circuit 6. In the following description, the display circuit 4 is shown in each drawing for ease of understanding, but the present invention is not limited to this, and the display circuit 4 may not be provided.

The storage circuit 5 includes a storage apparatus, such as a semiconductor memory, and is a circuit unit for storing processing data and a program used for various processing to be executed by the control circuit 6.

The control circuit 6 has a central processing unit (CPU) and its peripheral circuits and has a function of executing various processing, such as various applications and control for generating a traction illusion, by cooperating the CPU with the program of the storage circuit 5.

A first actuator (oscillator) A1 is a circuit unit that generates vibration V1 along a first axis O1.

A second actuator (oscillator) A2 is a circuit unit that generates vibration V2 along a second axis O2.

As specific examples of the first and second actuators A1, A2, for example, an oscillator having a known configuration as described in above-mentioned Patent Literature 1 may be used.

In embodiments of the present invention, the first actuator A1 is mounted in a direction in which the first axis O1 is non-parallel and non-perpendicular to at least one of the six surfaces, and the second actuator A2 is mounted in a direction in which the second axis O2 is non-parallel and non-perpendicular to at least one of the six surfaces.

For ease of understanding, in the following description, a case where the electronic equipment 1 includes both the first actuator A1 and the second actuator A2 will be described as an example, but the present invention is not limited to this. For example, even when only one actuator, such as only the first actuator A1, is mounted, similar effects to those described below can be obtained.

As shown in FIG. 1, in the present embodiment, the first actuator A1 is mounted at a position near the left-side surface 11L of the six surfaces in a direction in which the first axis O1 is non-parallel and non-perpendicular to the left-side surface 11L, that is, the virtual plane YZ, and the first actuator A1 generates vibration V1 along the first axis O1. Since the left-side surface 11L is parallel to the right-side surface 11R and orthogonal to the front surface 1F and the rear surface 11H along the direction Z, the first axis O1 is non-parallel and non-perpendicular to the virtual plane XZ, in addition to the virtual plane YZ, but is parallel to the virtual plane XY.

Further, in the present embodiment, the second actuator A2 is mounted at a position near the right-side surface 11R of the six surfaces in a direction in which the second axis O2 is non-parallel and non-perpendicular to the right-side surface 11R, that is, the virtual plane YZ, and the second actuator A2 generates vibration V2 along the second axis O2. Since the right-side surface 11R is parallel to the left-side surface 11L and orthogonal to the front surface 1F and the rear surface 11H along the direction Z, the second axis O2 is non-parallel and non-perpendicular to the virtual plane XZ, in addition to the virtual plane YZ, but is parallel to the virtual plane XY.

Thus, in the present embodiment, the first and second actuators A1, A2 are mounted in a direction in which the first and second axes O1, O2 are each non-parallel and non-perpendicular to a common one of the six surfaces, that is, the left-side surface 11L (right-side surface 11R), in other words, the same virtual plane YZ.

Specifically, as shown in FIG. 3, the first axis O1 obliquely intersects the left-side surface 11L, that is, the virtual plane YZ at an angle θ1 at a point P1, and the second axis O2 obliquely intersects the right-side surface 11R, that is, the virtual plane YZ at an angle θ2 at a point P2. In the present embodiment, the values of the angle θ1 and the angle θ2 are equal. Thus, the first and second actuators A1, A2 are disposed in a direction in which the first and second axes O1, O2 have opposite inclinations to each other by an equal angle θ1 (=θ2) with respect to the right-side surface 11R or the left-side surface 11L, that is, the virtual plane YZ, in other words, the first and second actuators A1, A2 are disposed in a shape of the Chinese character for eight as seen from the rear surface 11H. In this case, the first and second actuators A1, A2 may be disposed in an inverted shape of the Chinese character for eight as seen from the rear surface 11H.

Therefore, in the traction illusion generation control of the control circuit 6, the vibration V1 along the first axis O1 is generated only by driving the first actuator A1, so that the traction illusion can be generated in a direction oblique to the right-side surface 11R and the left-side surface 11L, that is, the virtual plane YZ. Further, the vibration V2 along the second axis O2 is generated only by driving the second actuator A2, so that the traction illusion can be generated in the direction oblique to the right-side surface 11R and the left-side surface 11L, that is, the virtual plane YZ.

Moreover, by unbalancing the intensities of the vibration V1, V2 of the first and second actuators A1, A2, a traction illusion can be generated with respect to an angular direction intermediate between the first axis O1 and the second axis O2, for example. Therefore, adjusting the intensity balance of the vibration V1, V2 with time enables a gradual change in the direction of the traction illusion. In addition, when the first and second actuators A1, A2 are simultaneously driven with the same intensity, a traction illusion along the direction Y can be generated in the same manner as in the conventional case.

Figure 4:
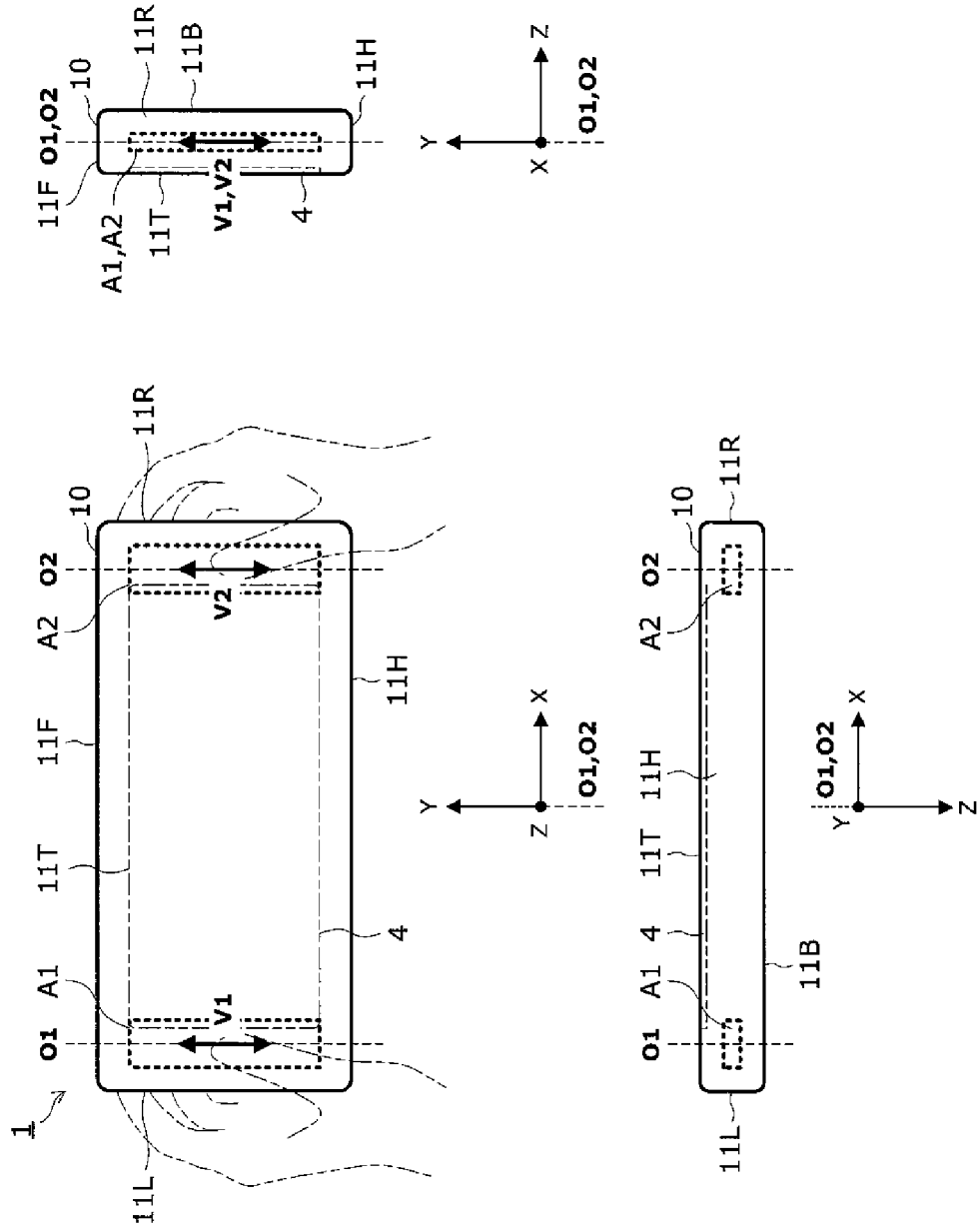
FIG. 4 is a three-side view showing a placement example of conventional actuators.
Figure 5:
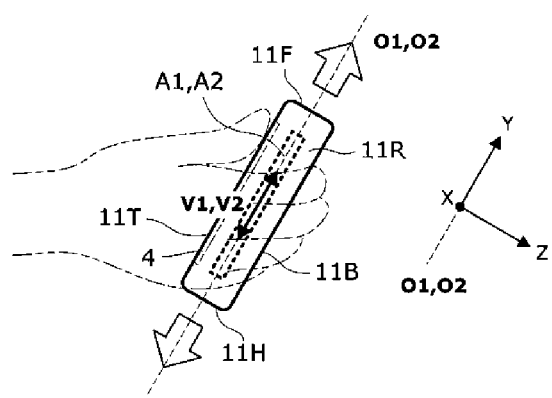
FIG. 5 is a right-side view showing a placement example of the conventional actuators.

FIG. 4 is a three-side view showing a placement example of conventional actuators. FIG. 5 is a right-side view showing a placement example of the conventional actuators. FIG. 4 shows an example where the first and second actuators A1, A2 are mounted in a direction in which the first and second axes O1, O2 are parallel to all of the right-side surface 11R, the left-side surface 11L, the upper surface 11T, and the lower surface 1B, that is, the virtual plane XY, the virtual plane XZ (ZX), and the virtual plane YZ, and are perpendicular to the front surface 11F and the rear surface 11H.

With the mounting in such a direction, as shown in FIG. 5, each of the vibration V1, V2 of the first and second actuators A1, A2 is in the direction Y, and hence a traction illusion is generated only in the direction Y. Therefore, in a state where the user holds the electronic equipment 1 with both hands in front of both arms, an illusion that the electronic equipment 1 is pulled obliquely to the direction Y, an illusion that the electronic equipment 1 is pulled backward, or an illusion that the electronic equipment 1 is pulled forward cannot be generated. Hence it is not possible to make the user feel a richer traction illusion or to enhance expressive power in an application, such as a game, performed by the electronic equipment 1.

Effects of First Embodiment

As described above, in the present embodiment, the first actuator A1 for generating the vibration V1 along the first axis O1 is mounted inside the housing 10 of the electronic equipment 1, and the first actuator A1 is mounted in a direction in which the first axis O1 is non-parallel and non-perpendicular to at least one of the six surfaces. Further, in the present embodiment, the second actuator A2 for generating the vibration V2 along the second axis O2 is mounted inside the housing 10 of the electronic equipment 1, and the second actuator A2 is mounted in a direction in which the second axis O2 is non-parallel and non-perpendicular to at least one of the six surfaces.

This makes it possible to generate a traction illusion not in a direction horizontal or vertical to the six surfaces of the housing 10 but in a direction oblique to any of the six surfaces. Hence it is possible to make the user feel a richer traction illusion and to enhance expressive power in an application, such as a game, performed by the electronic equipment 1.

In the present embodiment, the first and second actuators A1, A2 may be disposed near the left-side surface 11L and the right-side surface 11R of the six surfaces, respectively. This makes it possible to effectively generate a traction illusion at a position close to a portion of the electronic equipment 1 which is held by the user.

In the present embodiment, the first and second actuators A1, A2 may be mounted in a direction in which the first and second axes O1, O2 are each non-parallel and non-perpendicular to a common one of the six surfaces. This can enhance the intensity of the traction illusion to be generated.

In the present embodiment, the first and second actuators A1, A2 may be mounted in a direction in which the first and second axes O1, O2 have opposite inclinations to each other by an equal angle across the common surface. Thereby, traction illusions can be efficiently generated in more directions.

Further, in the present embodiment, the first and second actuators A1, A2 may be mounted in a direction in which the first and second axes O1, O2 are each non-parallel and non-perpendicular to at least the left-side surface 11L or the right-side surface 11R of the six surfaces. This makes it possible to generate a traction illusion in a direction oblique to the directions X and Y, that is, the virtual planes YZ and XZ.

In the present embodiment, the first and second actuators A1, A2 may be mounted in a direction in which the first and second axes O1, O2 are non-parallel to each other, and the first and second actuators A1, A2 may be driven by the control circuit 6 with different vibration intensities from each other. It is thereby possible to generate a traction illusion with respect to an angular direction intermediate between the first and second axes O1, O2. Adjusting the vibration intensities of the first and second actuators A1, A2 with time enables a gradual change in the direction of the traction illusion. Hence it is possible to make the user feel an extremely rich traction illusion and to greatly enhance expressive power in an application, such as a game, performed by electronic equipment 1.

Second Embodiment

Figure 6:
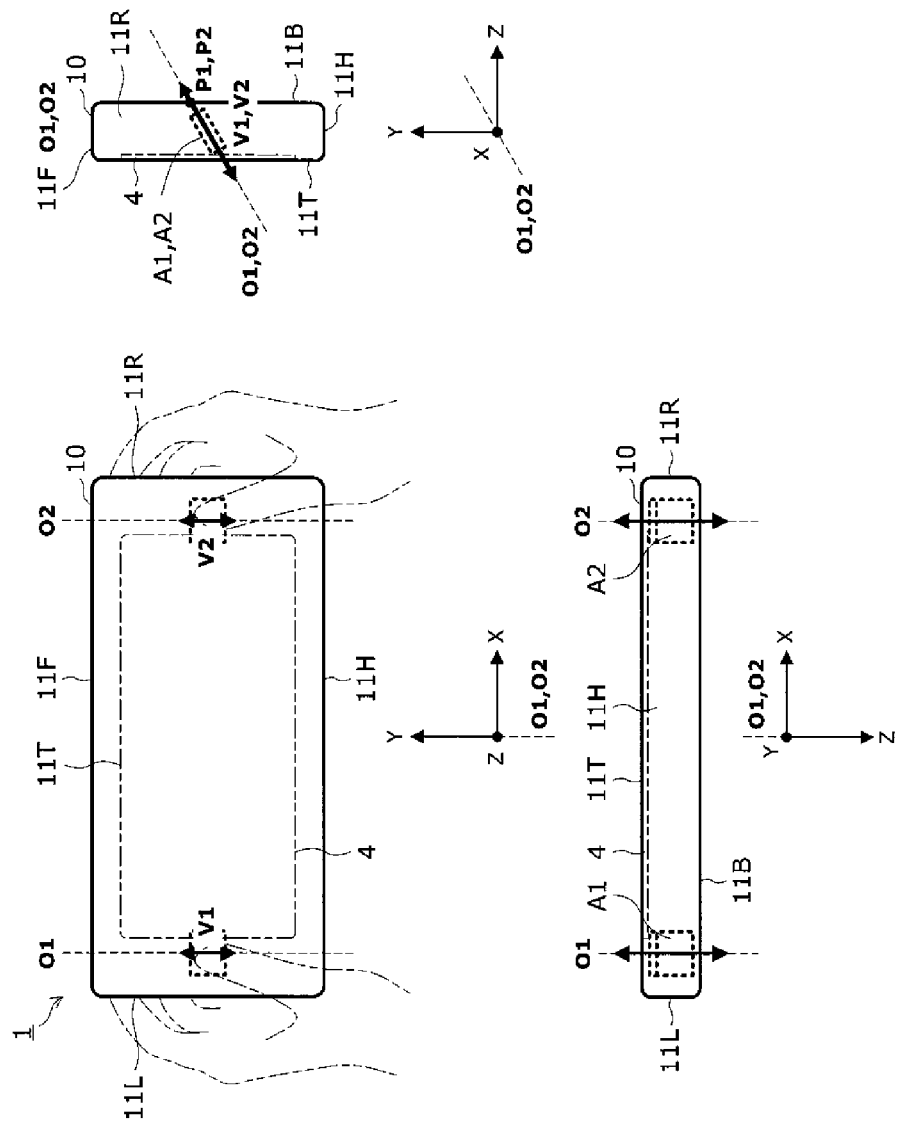
FIG. 6 is a three-side view showing a configuration of electronic equipment according to a second embodiment.
Figure 7:
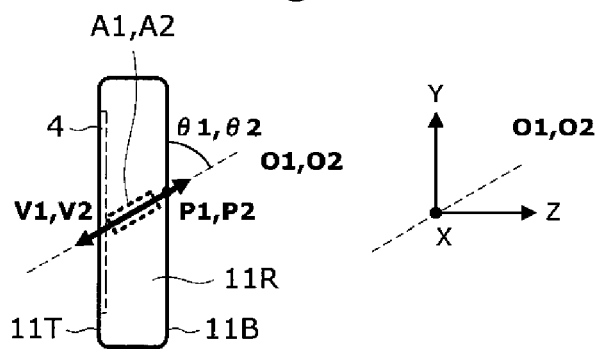
FIG. 7 is a right-side view showing a placement example of actuators according to the second embodiment.
Figure 8:
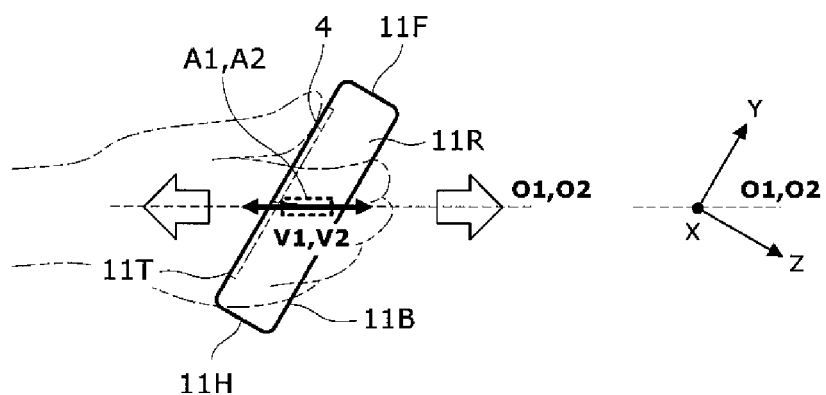
FIG. 8 is a right-side view showing an example of generation of a traction illusion in the electronic equipment according to the second embodiment.

Next, electronic equipment 1 according to a second embodiment of the present invention will be described with reference to FIGS. 6, 7, and 8. FIG. 6 is a three-side view showing the configuration of the electronic equipment according to the second embodiment. FIG. 7 is a right-side view showing a placement example of actuators according to the second embodiment. FIG. 8 is a right-side view showing an example of generation of a traction illusion in the electronic equipment according to the second embodiment.

As shown in FIGS. 6 and 7, in the present embodiment, the first actuator A1 is mounted at a position near the left-side surface 11L of the six surfaces in a direction in which the first axis O1 is non-parallel and non-perpendicular to the lower surface 11B, that is, the virtual plane XY, and the first actuator A1 generates vibration V1 along the first axis O1. Since the lower surface 11B is parallel to the upper surface 11T and orthogonal to the front surface 1F and the rear surface 11H along the direction Z, the first axis O1 is non-parallel and non-perpendicular to the virtual plane XZ, in addition to the virtual plane XY, but is parallel to the virtual plane YZ.

Further, in the present embodiment, the second actuator A2 is mounted at a position near the right-side surface 11R of the six surfaces in a direction in which the second axis O2 is non-parallel and non-perpendicular to the lower surface 11B, that is, the virtual plane XY, and the second actuator A2 generates vibration V2 along the second axis O2. Since the lower surface 11B is parallel to the upper surface 11T and orthogonal to the front surface 1F and the rear surface 11H along the direction Z, the second axis O2 is non-parallel and non-perpendicular to the virtual plane XZ, in addition to the virtual plane XY, but is parallel to the virtual plane YZ.

Specifically, as shown in FIG. 7, the first axis O1 obliquely intersects the lower surface 1B, that is, the virtual plane XY at an angle θ1 at a point P1, and the second axis O2 obliquely intersects the lower surface 11B, that is, the virtual plane XY at an angle θ2 at a point P2. In the present embodiment, the values of the angle θ1 and the angle θ2 are equal. Hence the first and second actuators A1, A2 are disposed parallel to each other in a direction in which the first and second axes O1, O2 are inclined by an equal angle θ1 (=θ2) with respect to the lower surface 11B or the upper surface 11T, that is, the virtual plane XY.

Thus, in the present embodiment, the first and second actuators A1, A2 are mounted in a direction in which the first and second axes O1, O2 are each non-parallel and non-perpendicular to a common one of the six surfaces, that is, the lower surface 11B (upper surface 11T), in other words, the virtual plane XY.

Therefore, as shown in FIG. 8, in a state where the user holds the electronic equipment 1 with both hands in front of both arms, it is possible to generate an illusion that the electronic equipment 1 is pulled backward and an illusion that the electronic equipment 1 is pulled forward, not in the direction along the virtual plane XY.

Figure 9:
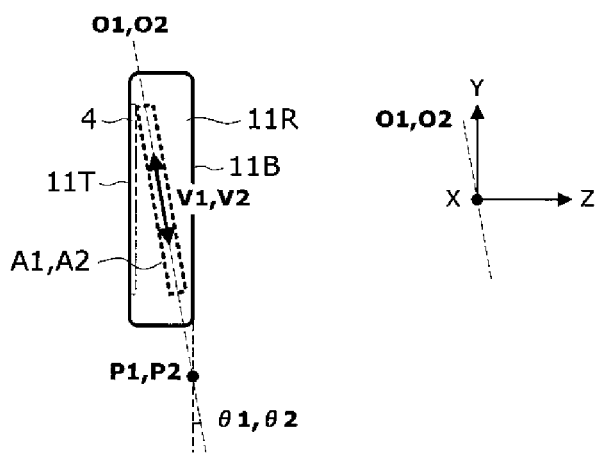
FIG. 9 is a right-side view showing another placement example of the actuators according to the second embodiment.
Figure 10:
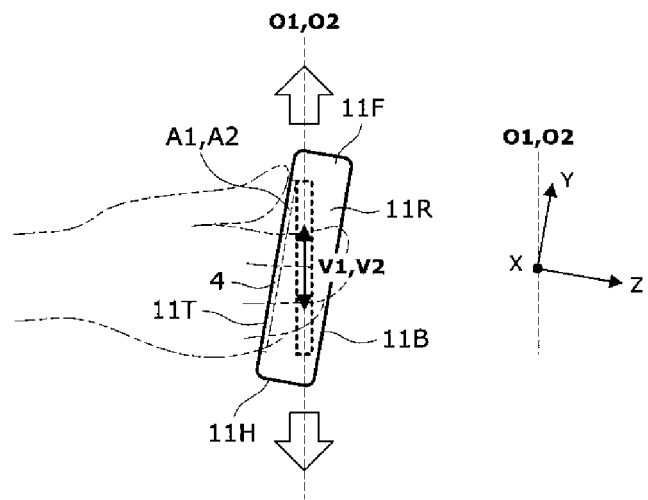
FIG. 10 is a right-side view showing another example of generation of a traction illusion in the electronic equipment according to the second embodiment.

FIG. 9 is a right-side view showing another placement example of the actuators according to the second embodiment. FIG. 10 is a right-side view showing another example of generation of a traction illusion in the electronic equipment according to the second embodiment. In FIG. 7 described above, the case has been described as an example where the first and second actuators A1, A2 are mounted obliquely to the virtual plane XY so that the end of the front surface 1F is close to the lower surface 1B, but the present invention is not limited to this.

In the present embodiment, as shown in FIG. 9, the first and second actuators A1, A2 may be mounted obliquely to the virtual plane XY so that the end of the front surface 1F is close to the upper surface 11T.

Thus, as shown in FIG. 10, in a state where the user holds the electronic equipment 1 with both hands in front of both arms, it is possible to generate an illusion that the electronic equipment 1 is pulled upward or downward, not in the direction along the virtual plane XY.

Effects of Second Embodiment

As described above, in the present embodiment, the first and second actuators A1, A2 are mounted in a direction in which the first and second axes O1, O2 are each non-parallel and non-perpendicular to the lower surface 11B or the upper surface 11T. This makes it possible to generate a traction illusion in a direction oblique to the virtual plane XY made up of the directions X and Y.

Therefore, in a state where the user holds the electronic equipment 1 with both hands in front of both arms, it is possible to generate illusions that the electronic equipment 1 is pulled in various directions as described below in addition to the direction along the virtual plane XY as shown in FIG. 5. Specifically, such illusions are an illusion that the electronic equipment 1 is pulled in a direction oblique to the virtual plane XY, that is, backward or forward as shown in FIG. 8, and an illusion that the electronic equipment 1 is pulled upward or downward. Hence it is possible to make the user feel a richer traction illusion and to enhance expressive power in an application, such as a game, performed by the electronic equipment 1.

Third Embodiment

Figure 11:
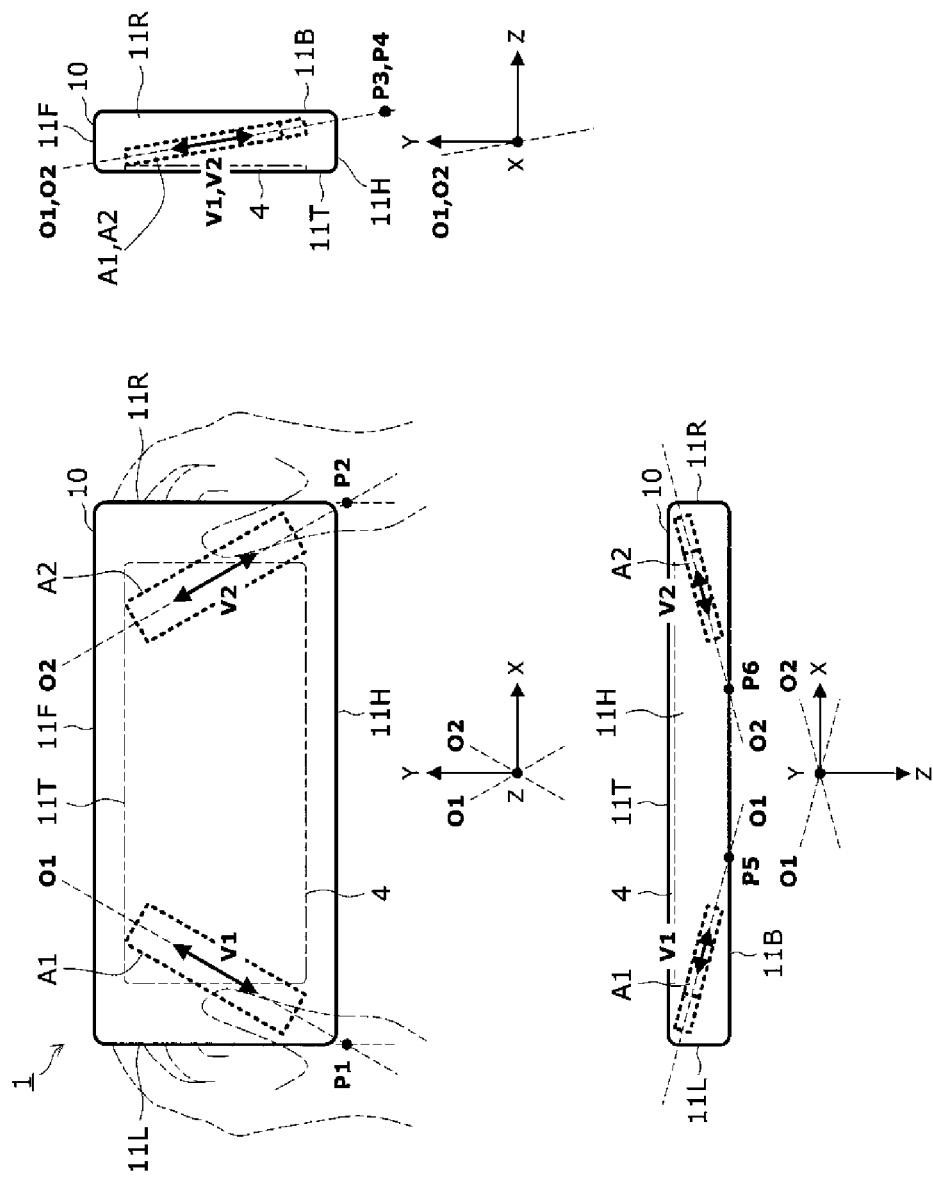
FIG. 11 is a three-side view showing a configuration of electronic equipment according to a third embodiment.
Figure 12:
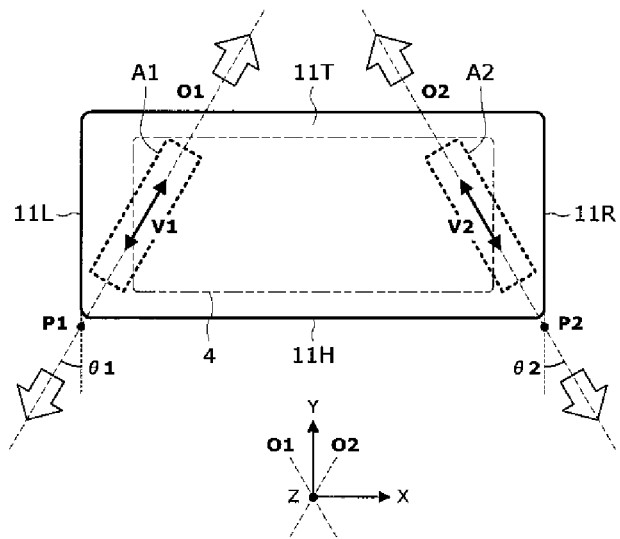
FIG. 12 is a top view showing a placement example of actuators according to the third embodiment.
Figure 13:
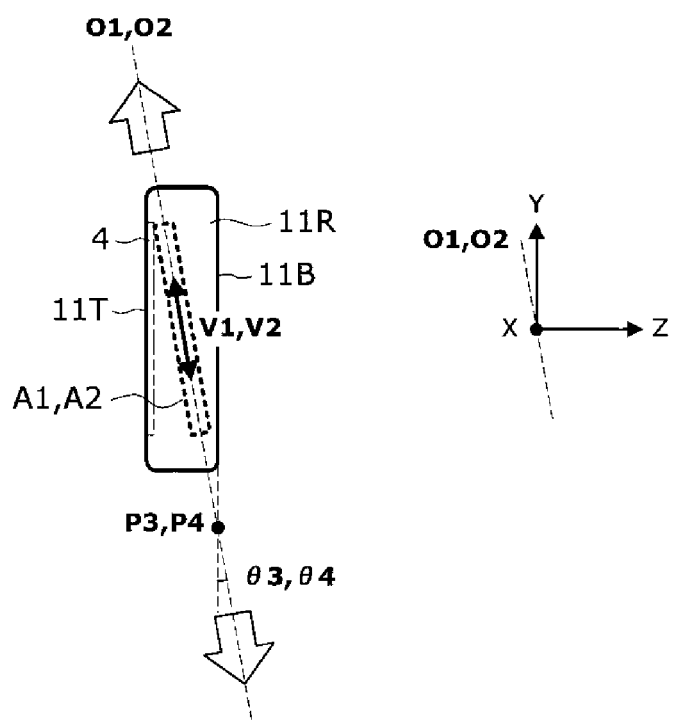
FIG. 13 is a right-side view showing a placement example of the actuators according to the third embodiment.
Figure 14:
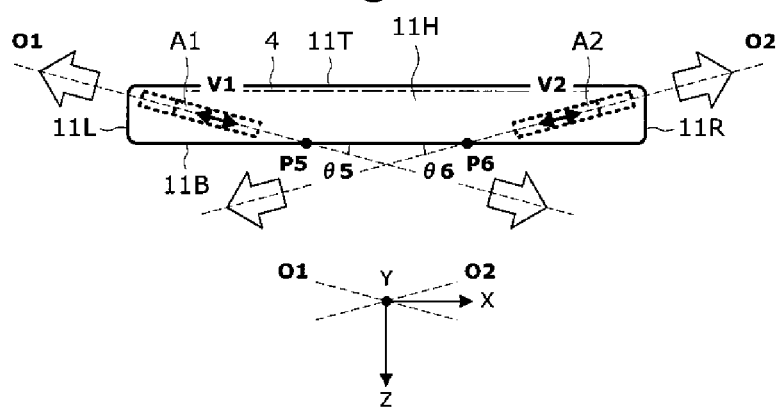
FIG. 14 is a rear view showing a placement example of the actuators according to the third embodiment.

Next, electronic equipment 1 according to a third embodiment of the present invention will be described with reference to FIGS. 11, 12, 13, and 14. FIG. 11 is a three-side view showing the configuration of the electronic equipment according to the third embodiment. FIG. 12 is a top view showing a placement example of actuators according to the third embodiment. FIG. 13 is a right-side view showing a placement example of the actuators according to the third embodiment. FIG. 14 is a rear view showing a placement example of the actuators according to the third embodiment.

As shown in FIG. 11, in the present embodiment, the first actuator A1 is mounted at a position near the left-side surface 11L of the six surfaces in a direction in which the first axis O1 is non-parallel and non-perpendicular to both the left-side surface 11L, that is, the virtual plane YZ and the lower surface 1B, that is, the virtual plane XY. Thus, the first actuator A1 generates vibration V1 along the first axis O1. The left-side surface 11L is parallel to the right-side surface 11R, the lower surface 11B is parallel to the upper surface 11T, and the left-side surface 11L and the lower surface 11B are each orthogonal to the front surface 1F and the rear surface 11H, so that the first axis O1 is non-parallel and non-perpendicular to the virtual plane XZ in addition to the virtual plane YZ and the virtual plane XY.

Further, in the present embodiment, the second actuator A2 is mounted at a position near the right-side surface 11R of the six surfaces in a direction in which the second axis O2 is non-parallel and non-perpendicular to both the right-side surface 11R, that is, the virtual plane YZ, and the lower surface 1B, that is, the virtual plane XY. Thereby, the second actuator A2 generates vibration V2 along the second axis O2. The left-side surface 11L is parallel to the right-side surface 11R, the lower surface 11B is parallel to the upper surface 11T, and the left-side surface 11L and the lower surface 11B are orthogonal to the front surface 1F and the rear surface 11H, so that the second axis O2 is non-parallel and non-perpendicular to the virtual plane XZ in addition to the virtual plane YZ and the virtual plane XY.

Thus, in the present embodiment, the first and second actuators A1, A2 are mounted in a direction in which the first and second axes O1, O2 are each non-parallel and non-perpendicular to both the left-side surface 11L (right-side surface 11R) and the upper surface 11T (lower surface 1B) of the six surfaces, that is, the virtual plane YZ and the virtual plane XY.

Specifically, as shown in FIG. 12, the first axis O1 obliquely intersects the left-side surface 11L, that is, the virtual plane YZ at an angle θ1 at a point P1 in the top view, and the second axis O2 obliquely intersects the right-side surface 11R, that is, the virtual plane YZ at an angle θ2 at a point P2 in the top view. In the present embodiment, the values of the angle θ1 and the angle θ2 are equal. Thus, the first and second actuators A1, A2 are disposed in a direction in which the first and second axes O1, O2 have opposite inclinations to each other by an equal angle θ1 (=θ2) in the top view with respect to the right-side surface 11R or the left-side surface 11L, that is, the virtual plane YZ, in other words, the first and second actuators A1, A2 are disposed in a shape of the Chinese character for eight as seen from the rear surface 11H.

Further, as shown in FIG. 13, the first axis O1 obliquely intersects the lower surface 1B, that is, the virtual plane XY at an angle θ3 at a point P3 in the side view, and the second axis O2 obliquely intersects the lower surface 1B, that is, the virtual plane XY at an angle θ4 at a point P4 in the side view. In the present embodiment, the values of the angle θ3 and the angle θ4 are equal. Hence the first and second actuators A1, A2 are disposed in a direction in which the first and second axes O1, O2 are inclined by an equal angle θ3 (=θ4), in the side view, with respect to the lower surface 11B or the upper surface 11T, that is, the virtual plane XY.

Further, as shown in FIG. 14, the first axis O1 obliquely intersects the lower surface 1B, that is, the virtual plane XY at an angle θ5 at a point P5 in the rear view, and the second axis O2 obliquely intersects the lower surface 1B, that is, the virtual plane XY at an angle θ6 at a point P6 in the rear view. In the present embodiment, the values of the angle θ5 and the angle θ6 are equal. Hence the first and second actuators A1, A2 are disposed in a direction in which the first and second axes O1, O2 are inclined by an equal angle θ5 (=θ6), in the rear view, with respect to the lower surface 11B or the upper surface 11T, that is, the virtual plane XY.

Third Embodiment

As described above, in the present embodiment, the first and second actuators A1, A2 are mounted in a direction in which the first and second axes O1, O2 are each non-parallel and non-perpendicular to both the left-side surface 11L or the right-side surface 11R and the lower surface 11B or the upper surface 11T. This makes it possible to generate a traction illusion in a direction oblique to all of the directions X Y, and Z, that is, the virtual planes XY, YZ, and XZ.

Therefore, in a state where the user holds the electronic equipment 1 with both hands in front of both arms, it is possible to generate an illusion that the electronic equipment 1 is pulled not only in the direction along the virtual plane XY as shown in FIG. 5 described above, but also in a direction oblique to each of all the virtual planes XY, YZ, and XZ. Hence it is possible to make the user feel a richer traction illusion and to enhance expressive power in an application, such as a game, performed by the electronic equipment 1.

Expansion of Embodiments

Although the present invention has been described with reference to the above embodiments, the present invention is not limited to the above embodiments. Various modifications can be made to the configuration and details of the present invention as can be understood by those skilled in the art within the scope of the present invention. In addition, each embodiment can be implemented in any combination within a range that is not inconsistent.

In each of the embodiments described above, the case has been described as an example where the housing 10 has the substantially rectangular parallelepiped shape of the flat plate with the six surfaces of the upper surface 11T, the lower surface 1B, the front surface 1F, the rear surface 11H, the left-side surface 11L, and the right-side surface 11R, and the directions of the first and second axes O1, O2 of the first actuators A1, A2 are defined by the positional relationship with these six surfaces. However, the present invention is not limited to this, and the directions of the first and second axes O1, O2 may be defined by the positional relationships with the orthogonal three axes defined for the electronic equipment 1, that is, the directions along the respective axes of the three-dimensional local coordinate system.

In general, in a case where coordinates are calculated in a three-dimensional space, a method for efficiently calculating coordinates has been adopted by defining a three-dimensional local coordinate system unique to each object existing in the space independently of the world coordinate system or the global coordinate system of the entire space. The three-dimensional local coordinate system is defined based on the shape and posture of each object. Hence the three-dimensional local coordinate system may be defined for the electronic equipment 1, and directions along the respective axes of the three-dimensional local coordinate system may be assigned to the directions X Y, and Z described above.

At this time, in a case where the three-dimensional local coordinate system for the electronic equipment 1 is defined based on the shape, as described above, virtual planes parallel to each of the six surfaces constituting the housing 10, that is, the upper surface 11T and the lower surface 1B, the front surface 1F and the rear surface 11H, the left-side surface 11L, and the right-side surface 11R, may be defined as the virtual plane XY, the virtual plane XZ, and the virtual plane YZ, and the perpendicular directions of these virtual plane XY, the virtual plane XZ, and the virtual plane YZ may be defined as the directions X Y, and Z.

In a case where a reference plane serving as a reference of the electronic equipment 1 exists, when a reference direction serving as a reference on the reference plane can be defined, the three-dimensional local coordinate system can be defined based on the reference plane and the reference direction.

For example, when the electronic equipment 1 has a flat shape like a smartphone, a pad, and a portable game machine, or when a main plane is provided in a part of the electronic equipment 1 like a game controller, the plane of the electronic equipment 1 can be defined as the reference plane. Alternatively, when a flat member such as an LCD display or an operation panel is disposed in the electronic equipment 1, the plane of the flat member can be defined as the reference plane. When the user holds and uses the electronic equipment 1 with both hands like a portable game machine and a game controller, a direction in which both ends of the electronic equipment 1, which are held by the user with both hands, face each other can be defined as the reference direction. Alternatively, in the basic posture of the electronic equipment 1 at the time when the user uses the electronic equipment 1, the horizontal direction (or vertical direction) of the electronic equipment 1 may be defined as the reference direction.

When the reference plane and the reference direction of the electronic equipment 1 can be defined in this manner, the reference plane may be defined as the virtual plane XY, and the reference direction may be defined as the direction X on the virtual plane XY. Thereby, on the virtual plane XY, a direction orthogonal to the direction X can be defined as the direction Y, and a perpendicular direction to the virtual plane XY can be defined as the direction Z.

Therefore, the positional relationship between the first and second axes O1, O2 of the first actuators A1, A2 and the six surfaces can be rephrased as a positional relationship with the directions along the respective axes of the three-dimensional local coordinate system defined for the electronic equipment 1.

For example, as shown in FIGS. 3 and 14, the positional relationship in which the first axis O1 is non-parallel to the left-side surface 11L, that is, the virtual plane YZ, can be rephrased as a relationship in which the first axis O1 is non-orthogonal to the direction X. As shown in FIGS. 7 and 9, the positional relationship in which the first axis O1 is non-parallel to the lower surface 11B, that is, the virtual plane XY, can be rephrased as a relationship in which the first axis O1 is non-orthogonal to the direction Z.

REFERENCE SIGNS LIST

1 Electronic equipment
2 Communication I/F circuit
3 Operation input circuit
4 Display circuit
5 Storage circuit
6 Control circuit
A1 First actuator
A2 Second actuator
10 Housing
11T Upper surface
11B Lower surface
11F Front surface
11H Rear surface
11L Left-side surface
11R Right-side surface
θ1 First axis
θ2 Second axis
V1, V2 Vibration.

The invention claimed is:

1. Electronic equipment comprising:
  a portable housing having a substantially rectangular parallelepiped shape with six surfaces, the six surfaces comprising an upper surface, a lower surface, a front surface, a rear surface, a left-side surface, and a right-side surface;
  a first actuator mounted inside the portable housing and configured to generate vibration along a first axis;
  a second actuator mounted inside the portable housing and configured to generate vibration along a second axis;
  a display circuit arranged on the upper surface and configured to display content output from the control circuit; and
  a control circuit configured to drive the first actuator and the second actuator in a manner that generates a traction illusion,
  wherein the first actuator and the second actuator are mounted in a configuration in which the first axis and the second axis are each non-parallel and non-perpendicular to at least the upper surface or the lower surface of the six surfaces.

2. The electronic equipment according to claim 1, wherein the first actuator is disposed closer to the left-side surface than the right-side surface, and wherein the second actuator is disposed closer to the right-side surface than the left-side surface.

3. The electronic equipment according to claim 1, wherein the first actuator and the second actuator are mounted in a configuration in which the first axis and the second axis are each non-parallel and non-perpendicular to a common surface of the six surfaces.

4. The electronic equipment according to claim 3, wherein the first actuator and the second actuator are mounted in a configuration in which the first axis and the second axis have opposite inclinations to each other by an equal angle across the common surface.

5. The electronic equipment according to claim 1, wherein the first actuator and the second actuator are mounted in a configuration in which the first axis and the second axis are each non-parallel and non-perpendicular to at least the left-side surface or the right-side surface of the six surfaces.

6. The electronic equipment according to claim 1,
  wherein the first actuator and the second actuator are mounted in a configuration in which the first axis and the second axis are non-parallel to each other, and
  wherein the control circuit is configured to drive the first actuator and the second actuator with different vibration intensities from each other.

7. Electronic equipment comprising:

a portable housing having a space inside;

a first actuator that is mounted inside the portable housing and configured to generate vibration along a first axis;

a second actuator that is mounted inside the portable housing and configured to generate vibration along a second axis; and a control circuit configured to drive the first actuator and the second actuator to generate a traction illusion, wherein the first actuator and the second actuator are mounted in a configuration in which the first axis and the second axis are non-parallel and non-perpendicular to a virtual plane XY, a virtual plane YZ, and a virtual plane XZ in a three-dimensional local coordinate system of the portable housing.

8. The electronic equipment according to claim 7, wherein the first actuator is disposed closer to a first surface of the portable housing than a second surface of the portable housing, and wherein the second actuator is disposed closer to the second surface than the first surface, and wherein the first surface is opposite to the second surface.

9. A method comprising:

providing a portable housing having a substantially rectangular parallelepiped shape with six surfaces, the six surfaces comprising an upper surface, a lower surface, a front surface, a rear surface, a left-side surface, and a right-side surface;

mounting a first actuator in the portable housing, wherein the first actuator is configured to generate vibration along a first axis;

mounting a second actuator mounted inside the portable housing, wherein the second actuator is configured to generate vibration along a second axis; and providing a control circuit configured to drive the first actuator and the second actuator in a manner that generates a traction illusion, wherein the first actuator and the second actuator are mounted in a configuration in which the first axis and the second axis are each non-parallel and non-perpendicular to at least the upper surface or the lower surface of the six surfaces, and wherein a display circuit is arranged on the upper surface and configured to display content output from the control circuit.

* * * * *